(12) United States Patent
Chiodini

(10) Patent No.: US 6,882,691 B2
(45) Date of Patent: Apr. 19, 2005

(54) FINE-FREQUENCY OFFSET ESTIMATION

(75) Inventor: Alain Chiodini, Mountain View, CA (US)

(73) Assignee: Proxim Corporation, Sunnyvale, CA (US)

( * ) Notice: Subject to any disclaimer, the term of this patent is extended or adjusted under 35 U.S.C. 154(b) by 577 days.

(21) Appl. No.: 09/802,586

(22) Filed: Mar. 8, 2001

(65) Prior Publication Data

US 2002/0159540 A1 Oct. 31, 2002

(51) Int. Cl.$^7$ ............................................... H04L 27/16

(52) U.S. Cl. .................... 375/326; 375/344; 455/182.2; 455/182.3; 455/183.2

(58) Field of Search .................................. 375/324, 326, 375/327, 344, 354, 362, 375, 261; 455/181.1, 182.1, 182.2, 182.3, 183.1, 183.2, 192.1, 192.2, 192.3; 370/509, 503, 512; 327/141, 154

(56) References Cited

U.S. PATENT DOCUMENTS 6,150,892 A * 11/2000 Lee et al. ...................... 331/46
6,633,616 B1 * 10/2003 Crawford ..................... 375/326

* cited by examiner

Primary Examiner—Dac V. Ha
(74) Attorney, Agent, or Firm—Thelen Reid & Priest LLP

(57) ABSTRACT

Orthogonal frequency division multiplexing (OFDM) receiver embodiments of the invention demodulate quadrature amplitude modulated (QAM) signals transmitted in the five GHz frequency band and digitally correct for frequency offset errors in their digital signal processing (DSP) units. A method comprises a step in which an OFDM transmission is I/Q sampled and a portion of the received packet is selected. It is assumed that the coarse frequency offset has been estimated and that the remaining frequency offset after coarse frequency offset compensation does not exceed ±10 kHz (valid for 802.11a PHY implementation only). It is also assumed that a timing reference has been determined. A cost function is used to determine a fine-frequency offset. Once the fine frequency offset is determined, the estimate is used in the downstream digital signal processing.

9 Claims, 3 Drawing Sheets

FINE-FREQUENCY OFFSET ESTIMATION

BACKGROUND OF THE INVENTION

1. Technical Field

The invention relates to physical layer (PHY) digital signal processing for use in processors developed for wireless local area networks (LAN's), and more particularly to wireless LAN's based on orthogonal frequency division multiplexing (OFDM) of the license-free national information structure (U-NII) radio spectrum bands in the United States and generally conforming to IEEE Specification 802.11a.

2. Description of the Prior Art

Local area networks (LAN's) have traditionally been interconnected by twisted-wire pairs and shielded cables. However, there are several deficiencies of traditional LAN's, the main being restricted mobility. In contrast, a whole class of untethered computing has emerged which uses complex modulation and coding to achieve high-speed data rates. The IEEE 802.11a standard, herein "802.11a", specifies, among other things, the physical layer (PHY) entity for an orthogonal frequency division multiplexing (OFDM) system with data payload communication capabilities of 6,9,12,18,24,36,48, and 54 Mb/s. The 802.11a standard specifies RF transmission in the 5.15–5.25, 5.25–5.35, and 5.725–5.825 GHZ unlicensed national information structure (U-NII) bands.

Typically, the IEEE communication standards specify the transmit bit-stream in addition to performance specifications, RF emissions requirements, etc.

The wireless transmission medium inherently introduces some unique impairments (not present in traditional LAN's) to the transmitted signal, which must be mitigated in the remote receiver station. These impairments include signal fading, multi-path reflections, base—and remote—unit oscillator mismatch introduced frequency offset, timing misalignment, and timing synchronization. In addition, there are RF hardware limitations such as receiver IQ imbalance and phase noise that must be mitigated as well. As such, the mitigation of such effects falls under the category of baseband digital signal processing. To assist the remote unit in mitigating these effects, a known training sequence is usually embedded into the transmit bit stream. This occurs at the expense of bandwidth. Of course, the same problems occur in the upstream direction (remote station transmitting to the base station), but it suffices to discuss the downstream digital signal processing.

In this disclosure, one such digital signal processing method, fine frequency estimation, is outlined. This processing block digitally estimates the oscillator mismatch between the base- and remote-station and corrects for it in subsequent data demodulation. Typical voltage-controlled temperature-compensated crystal oscillators (VCTCXO) used in wireless communications have a ±20 (parts-per-million) ppm error. At 5 GHz (5000 MHz), this translates to an error of ±100 kHz at each end, or ±200 kHz in combination. With OFDM modulation, a frequency error of 3% of the inter-carrier frequency spacing is the maximum tolerable frequency error.

The transmission scheme in 802.11a is bursty. This means that the receivers must digitally process the training sequence to mitigate the undesired signal impairments each time a burst commences. This means that it is desirable for the processing blocks to be as robust and computationally efficient as possible.

The quality of carrier frequency-offset estimation must be such that the relative error between actual and estimated values does not exceed three percent of the frequency spacing between consecutive sub-carriers, e.g. 9.375 kHz. To reach this target precision, the 802.11a PHY specification recommends that frequency offset estimation be carried out into two successive stages, a coarse and fine frequency estimation stage. Coarse and fine estimates must be derived from the processing of the short and long preambles respectively. See, IEEE-802.11a-1999, §17.3.3. For short, these are called the "short preamble" and the "long preamble".

Frequency offset errors need to be removed in order for a receiver to track the transmitted signal and demodulate it properly. A conventional method exists to remove such offset, which involves a control loop, which feeds a frequency error signal back to a VCTCXO to slowly correct the oscillator mismatch. C&S Technology (Korea) has announced a wireless-LAN modem-chip for IEEE-802.11a applications (see http://cnstec.com/e-html/products/products-1-2-4.htm). Such uses an automatic frequency control (AFC) clock recovery circuit to correct frequency offset errors. However, due to the relatively short time span of the training sequence and the loop bandwidth of the control loop may result in inaccurate frequency correction. The method described herein does not use AFC circuitry. Rather, it estimates the existing frequency offset and instead of correcting for it with an AFC loop in an analog fashion, it constructs a frequency correcting cisoid at a frequency that is negative to the estimated frequency offset and uses this in subsequent digital signal processing and demodulation.

SUMMARY OF THE INVENTION

Orthogonal frequency division multiplexing (OFDM) receiver embodiments of the invention demodulate OFDM signals (embedding quadrature amplitude modulated (QAM) signals) transmitted in the 5 GHz frequency band and digitally correct for frequency offset in their digital signal processing (DSP) units. These include binary phase shift keying (BPSK), quadrature phase shift keying (QPSK), 16-QAM and 64-QAM (and 256-QAM in future standard enhancements). The method assumes that the coarse frequency offset value has already been estimated using the first part of the preamble (also referred to as short preamble) and that the second part of the preamble (also referred to as long preamble), which is subsequently used for fine frequency offset estimation, has been frequency offset corrected accordingly. It is also assumed that the boundary between short and long preambles has been precisely determined. A presently preferred method comprises a step in which an OFDM signal is I/Q sampled. The minimization of a cost function provides the fine frequency offset value. Once this value is available, it is used in the downstream digital signal processing.

DETAILED DESCRIPTION OF THE INVENTION

Figure 1:
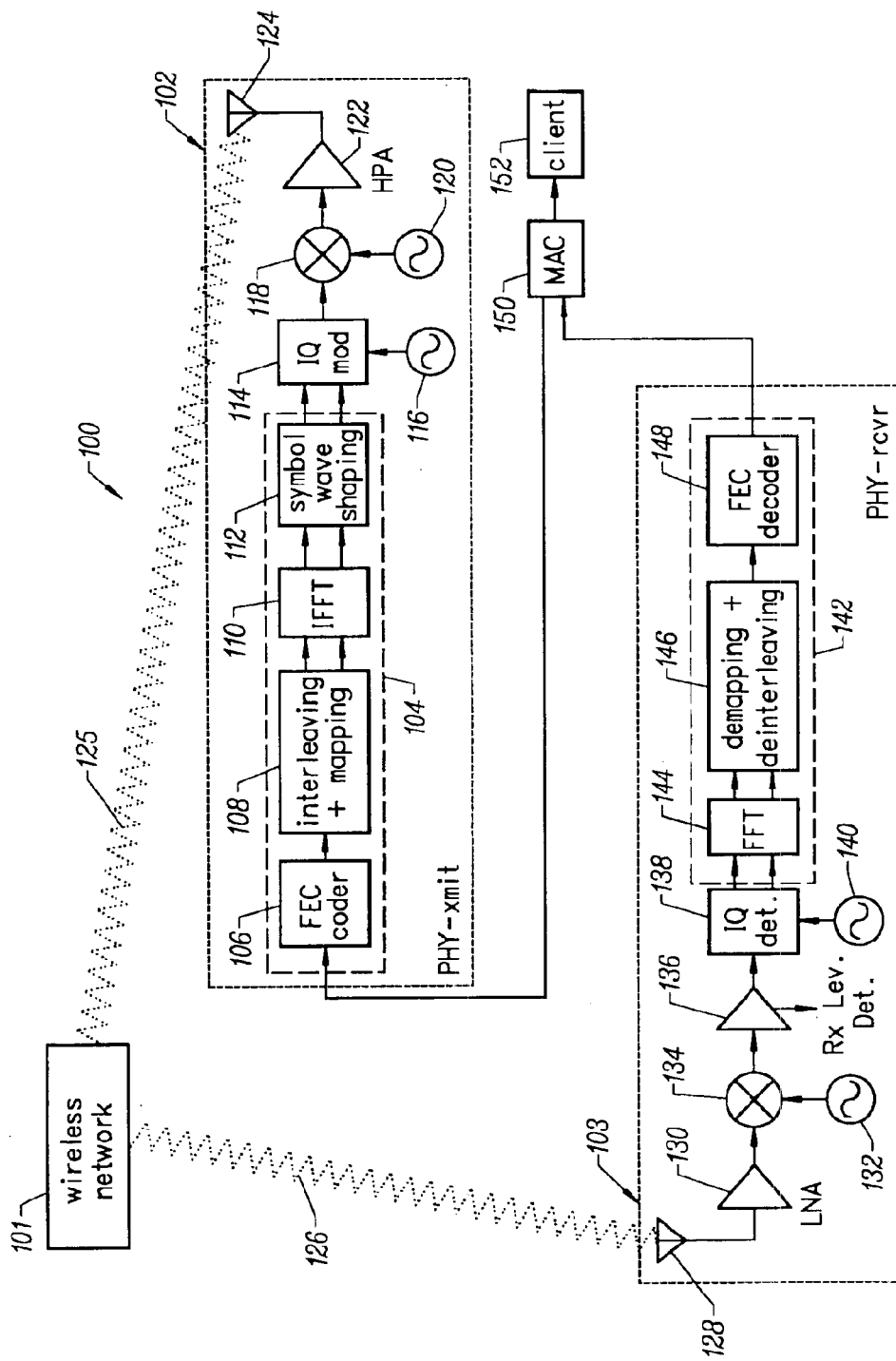
FIG. 1 is a functional block diagram of an OFDM radio-transceiver embodiment of the invention.

FIG. 1 illustrates a wireless local area network (LAN) embodiment of the invention, and is referred to herein by the general reference numeral 100.

Such wireless LAN is preferably based on orthogonal frequency division multiplexing (OFDM), and quadrature phase shift keying (QAM) of signals transmitted in the license-free 5 GHz frequency band. The wireless LAN 100 typically includes a wireless network 101 connected to the Internet, a PHY-transmitter 102, and a PHY-receiver 103. Such units all conform to the IEEE-802.11a specification for a physical layer (PHY) interface in a wireless local area network which allows mobile clients. The transmitter 102 comprises a digital signal processor (DSP) 104 which implements a forward error correction (FEC) coder 106, an interleaving and mapping process 108, an inverse fast Fourier transform processor 110, and a symbol wave shaper 112. The DSP 104 outputs in-phase (I) and quadrature-phase (Q) signals that are input to an IQ modulator 114 driven by a local oscillator 116. The modulated output is sent to a mixer 118 for upconversion to the 5 GHz band. A second local oscillator 120 provides the necessary carrier frequency. A high power amplifier (HPA) 122 drives a transmitter antenna 124. A radio up-link 125 is received by the wireless network 101. In general, the transmitter 102 can be implemented with conventional methods and components.

The receiver 103 receives a radio down-link 126 that is typically transmitted in bursts. Each packet is begun with a training sequence, e.g. a short and long preamble. The receiver 103 includes a receiver antenna 128 followed by a low-noise amplifier (LNA) 130. A local oscillator 132 and a first mixer 134 produce an intermediate frequency (IF). An automatic gain control (AGC) amplifier 136 smoothes out signal-strength variations and drives an IQ-detector 138. A second local oscillator 140 provides the carrier necessary to derive the I/Q samples, e.g. 16-bit binary at 20.0 MHz. In all presently preferred embodiments of the invention, no automatic frequency control (AFC) clock recovery is needed because any frequency offset are corrected in later digital processing. A receiver-DSP 142 comprises a fast Fourier transform process 144, a demapping and deinterleaving process 146, and an FEC decoder 148. The receiver-DSP 142 further includes the necessary digital logic needed for carrier frequency offset determination and correction.

The higher levels of the mobile client are represented by a media access controller (MAC) 150 and a client agent software 152.

The frequency-offset estimation error must not exceed three percent of the adjacent sub-carrier channel spacing, e.g. 9.375 kHz is a rule of thumb that was derived from the OFDM-related papers. The specification therefore recommends that frequency offset estimation be carried out into two successive stages, e.g. a coarse estimation followed by a fine estimation. Such estimates are respectively derived from the processing of the so-called short and long preambles. These two training sequences are of equal duration and constitute the packet preamble. Neither contains any information. The short preamble is composed of ten identical elementary waveforms ('short symbols') in succession while the long preamble is composed of two longer basic constituents ('long symbols') preceded by a guard interval. All presently preferred embodiments of the invention rely on this observation and use digital signal processing methods to correct the common frequency offset that has been computed in a wireless local area network.

This disclosure is directed to the fine estimation of frequency offset using the long preamble. The estimation of the coarse frequency offset using the short preamble is the first operation to be performed once an incoming packet has been detected. One embodiment of coarse frequency estimation is disclosed in "Coarse Frequency Offset Estimation—Patent Disclosure", Alain Chiodini, John Reagan, nBand Communications, 2000. In presently preferred embodiments of the invention, the coarse frequency offset operation precedes any intra-baud timing offset synchronization estimation. This information is needed to achieve proper demodulation of data-bearing OFDM symbols. In fact, all that is needed here is the knowledge of a timing reference point referred to as "boundary between long and short preambles". This is the purpose of the synchronization operation. One embodiment of synchronization acquisition operation is disclosed in "OFDM Data Demodulator Synchronization—Patent Disclosure", John Reagan, Alain Chiodini, nBand Communications, 2000.

Figure 2:
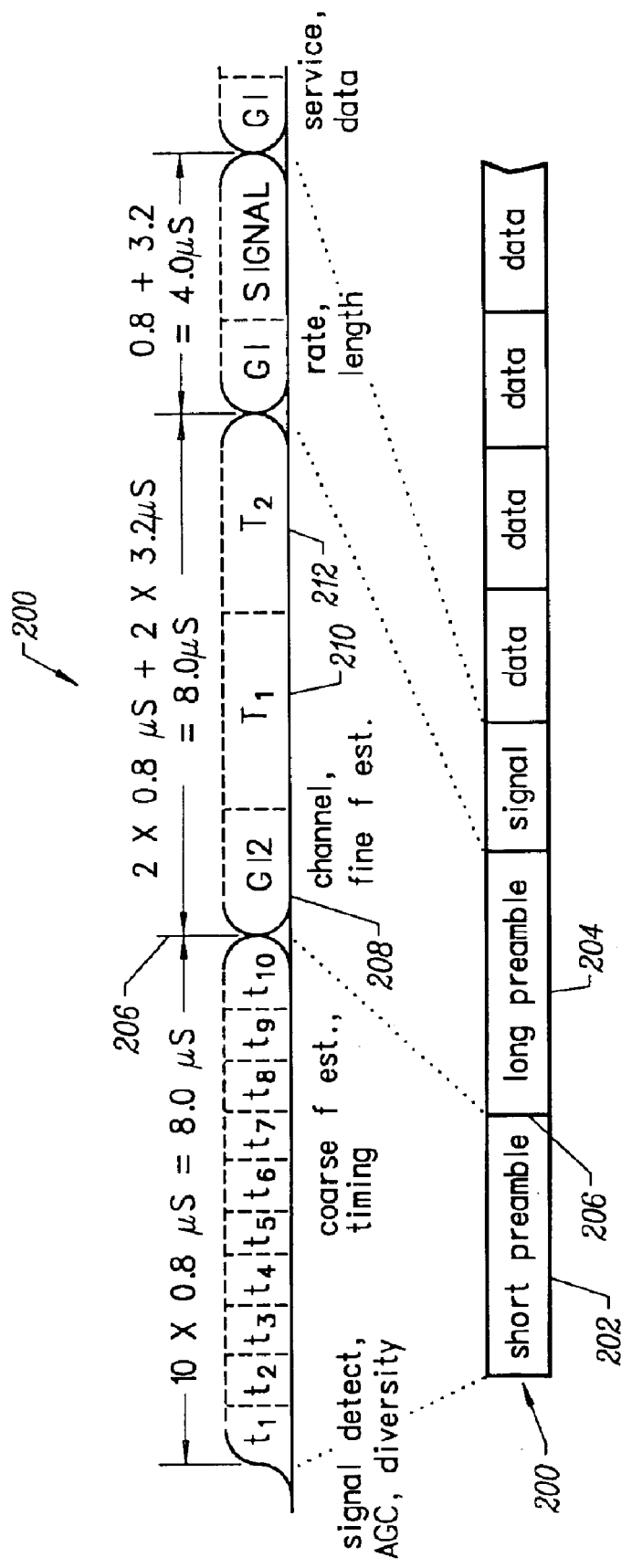
FIG. 2 is a diagram representing the structure of the synchronizing PLCP preamble, signal, and data fields used for the physical layer (PHY) of a wireless local area network (LAN) conforming to the IEEE-802.11a specification.

The fine-frequency offset can be computed once the coarse frequency offset and synchronization, i.e. accurate determination of the boundary between short and long preambles has been determined. FIG. 2 illustrates a burst transmission structure 300 that begins with a short preamble 302 followed by a long preamble 304. A boundary 306 serves as an important timing point, and previous circuitry must find this point in transmission time before fine-frequency offset determination can proceed. Each of the short preamble 302 and long preamble 304 periods are 8.0 µs long. The long preamble begins with a guard interval (GI) that is two 0.8 µs units long. Each long symbol, T1 and T2, is 3.2 µs in transmission duration.

The received signal is typically measured in 16-bit I/Q samples every 0.05 µs, and overall it can be modeled as, $$x(n) = A(n)e^{j\Phi(n)+j2\pi\frac{v}{F_s}n+j\varphi} + \eta(n)$$

where,
$\Phi(n)$: long preamble phase
v: residual frequency offset
$\varphi$: phase offset
$\eta(n)$: additive white Gaussian noise (AWGN)

An algorithm similar to the well known multiple signal classification (MUSIC) is used in an embodiment of the invention. This algorithm is specifically applied to a selected portion of the long preamble. Please note that the length of the processed signal must be a multiple of 64 samples (when the sampling frequency is 20 MHz) since the basic constituent of the long preamble is generated from a 64-element sequence. This leaves us with two possibilities: we can choose to process either T1 or T2 (3.2 microsecond=64 samples), either the sequence T3 encompassing both T1 and T2 (6.4 microsecond=128 samples). The timing knowledge, i.e. the knowledge of the boundary between short and long preambles, needed to extract either sequence is a direct result of the synchronization stage. From a performance standpoint, it is of course better to work on T3. The length of the processed signal determines the dimension of the vector space dealt with. This vector space can be decomposed into two orthogonal subspaces: a signal and a non-signal subspaces.

If T3 is selected, the dimension of the vector space is 128, and it is appropriate to use the orthonormal basis $\{V_m\}_{m\in[0\ldots127]}$ formed by the row vectors of the 128×128 square matrix associated with the 128-element discrete Fourier transform to span it. In this case, the signal subspace is spanned by the 52-element subset of row vectors (or "frequency components") indexed by [2 4 6 8 . . . 52] and [76 78 80 82 . . . 126] while the non-signal subspace is spanned by the 76-element complementary subset of row vectors, i.e. those indexed by 0, [1 3 5 7 . . . 51], 53 through 75 and [77 79 81 83 . . . 127]. Two of these vectors are real and expressed in a most simple way:

$V_0$=[1 1 1 1 . . . 1 1]

$V_{64}$=[1 −1 1 −1 . . . 1 −1]

Now, if T1 or T2 is selected, the dimension of the vector space is 64 and it is appropriate to use the orthonormal basis $\{V_m\}_{m\in[0\ldots 6.3]}$ formed by the row vectors of the 64×64 square matrix associated with the 64-element discrete Fourier transform to span it. In this case, the signal subspace is spanned by the 52-element subset of row vectors indexed by 1 through 26 and 38 through 63 while the non-signal subspace is spanned by the 12-element complementary subset of row vectors, i.e. those indexed by 0 and 27 through 37. Two of these vectors are real and expressed in a most simple way:

$$V_0 = [1\ 1\ 1\ 1\ \ldots\ 1\ 1]$$

$$V_{32} = [1\ -1\ 1\ -1\ \ldots\ 1\ -1]$$

For the sake of simplicity, let us assume that a 64-sample signal, i.e. one basic constituent is being processed: The forthcoming equations also apply to the 128-sample case at the expense of an index range (and also composition modification. Note that in either case (64- or 128-sample long signal) the signal subspace is always spanned by fifty-two rows vectors.

In the ideal absence of any frequency offset and noise, the dot product of any non-signal space vector and an incoming signal vector is zero, $$V_m X = \sum_{n=0}^{63} v_m(n) x(n) = 0 \text{ with } m \in [0, 27 \ldots 37]$$

When applied to $V_0$, this simply leads to, $$V_0 \begin{bmatrix} x(0) \\ x(1) \\ \vdots \\ x(63) \end{bmatrix} = \sum_{n=0}^{63} x(n) = 0$$

A plot of $\Gamma(\nu) = |V_0 X(\nu)|^2$ for $\nu \in [-10, 10]$ kHz shows a very sharp notch at $\nu = 0$ kHz, suggesting that a cost function can be used to determine $\nu$, for example $$C(\hat{\nu}) = |V_0 X_{\hat{\nu}}|^2 = \left| \sum_{n=0}^{63} x(n) e^{-j2\pi \frac{\hat{\nu}}{F_s} n} \right|^2$$

Method embodiments of the invention can safely assume that the fine-frequency offset is no more than ±10 kHz because that is the outer bounds of a preceding coarse frequency offset compensation. The ±10 kHz requirement is valid for the 802.11a PHY only. In other applications, this frequency interval can be either increased or decreased depending on the sampling frequency Fs used in the receiver (Fs determines the frequency range when the Taylor expansion takes place). Therefore, the expression can be Taylor expanded, $$C(\hat{\nu}) \cong \left| \sum_{n=0}^{63} x(n) \left( 1 - \frac{1}{2} \left( 2\pi \frac{\hat{\nu}}{F_s} n \right)^2 - j \left( 2\pi \frac{\hat{\nu}}{F_s} n \right) \right) \right|^2$$

If $\omega = 2\pi \frac{\hat{\nu}}{F_s}$, then $C(\omega) \cong \left| \sum_{n=0}^{63} x(n) \left( 1 - \frac{1}{2} \omega^2 n^2 - j\omega n \right) \right|^2$ Minimizing $C(\omega)$ with respect to $\omega$, $$\frac{\partial C}{\partial \omega} = \frac{\partial}{\partial \omega} \left[ \left( \sum_{n=0}^{63} \underbrace{x_R(n) - \frac{\omega^2 n^2}{2} x_R(n) + \omega n x_I(n)}_{A(n)} \right)^2 + \right.$$

$$\left. \left( \sum_{n=0}^{63} \underbrace{x_I(n) - \frac{\omega^2 n^2}{2} x_I(n) - \omega n x_R(n)}_{B(n)} \right)^2 \right]$$

$$= 2 \sum_{m=0}^{63} (-\omega m x_R(m) + x_I(m)) \sum_{n=0}^{63} A(n) +$$

$$2 \sum_{m=0}^{63} (-\omega m x_I(m) - x_R(m)) \sum_{n=0}^{63} B(n)$$

$$= 2(-\omega X_{R,1} + X_{I,0}) \left( X_{R,0} - \frac{\omega^2}{2} X_{R,2} + \omega X_{I,1} \right) +$$

$$2(-\omega X_{I,1} - X_{R,0}) \left( X_{I,0} - \frac{\omega^2}{2} X_{I,2} - \omega X_{R,1} \right)$$

$$= -2\omega X_{R,1} X_{R,0} + \omega^3 X_{R,1} X_{R,2} - 2\omega^2 X_{R,1} X_{I,1} + 2 X_{I,0} X_{R,0} -$$

$$\omega^2 X_{I,0} X_{R,2} + 2\omega X_{I,0} X_{I,1} - 2\omega X_{I,1} X_{I,0} + \omega^3 X_{I,1} X_{I,2} +$$

$$2\omega^2 X_{I,1} X_{R,1} - 2 X_{R,0} X_{I,0} + \omega^2 X_{R,0} X_{I,2} + 2\omega X_{R,0} X_{R,1}$$

$$= \omega^2 (\omega(X_{R,1} X_{R,2} + X_{I,1} X_{I,2}) + (X_{R,0} X_{I,2} - X_{I,0} X_{R,2}))$$

where, $$X_{R \text{ or } I}^p = \sum_{n=0}^{63} n^p x_{R \text{ or } I}(n).$$

$$\frac{\partial C}{\partial \omega} = 0 \Rightarrow \text{either } \omega = 0 \text{ or } \omega = \frac{X_{I,0} X_{R,2} - X_{R,0} X_{I,2}}{X_{R,1} X_{R,2} + X_{I,1} X_{I,2}}$$

In practice, the received signals are necessarily observed through a limited-time window, and so an undesirable Gaussian distributed DC-offset is generated. Therefore, it is wrong to assume that there is a zero-mean additive white Gaussian noise (AWGN). Such DC-offset greatly deteriorates algorithm performance at low signal-to-noise ratios, and it cannot be eliminated by simply subtracting the mean in-phase (I) and quadrature-phase (Q) components from the received signal. This because the frequency offset is another DC component that must be preserved in order to effectuate its compensation.

The conventional multiple signal classification (MUSIC) algorithm can be used to estimate the pseudospectrum from a signal or a correlation matrix using Schmidt's eigenspace analysis method. See, R. O. Schmidt, *Multiple Emitter Location and Signal Parameter Estimation* IEEE Transactions Antenna Propagation, vol. AP-34, pp. 276–280 (March 1986). The algorithm estimates the signal's frequency content by way of an eigenspace analysis of the signal's correlation matrix, and is used where the signals are the sum of sinusoids with additive white Gaussian noise. The eigenvalues and eigenvectors of the signal's correlation matrix can be estimated if the correlation matrix is not supplied, e.g. as in the PMUSIC commercial product marketed by The MathWorks, Inc. (www.mathworks.com). The MUSIC pseudospectrum estimate is, $$y_{music}^{(f)} = \frac{1}{e^H(f)\left(\sum_{k=p+1}^{N} v_k v_k^H\right)e(f)} = \frac{1}{\sum_{k=p+1}^{N} |v_k^H e(f)|^1}$$

where N is the dimension of the eigenvectors and $v_k$ is the k-th eigenvector of the correlation matrix. The integer p is the dimension of the signal subspace, so the eigenvectors $v_k$ used in the sum correspond to the smallest eigenvalues and also span the noise subspace. The vector e(f) consists of complex exponentials, so the inner product $v_k^H e(f)$ amounts to a Fourier transform. This is used for computation of the pseudospectrum estimate. The FFT is computed for each $v_k$ and then the squared magnitudes are summed.

Figure 3:
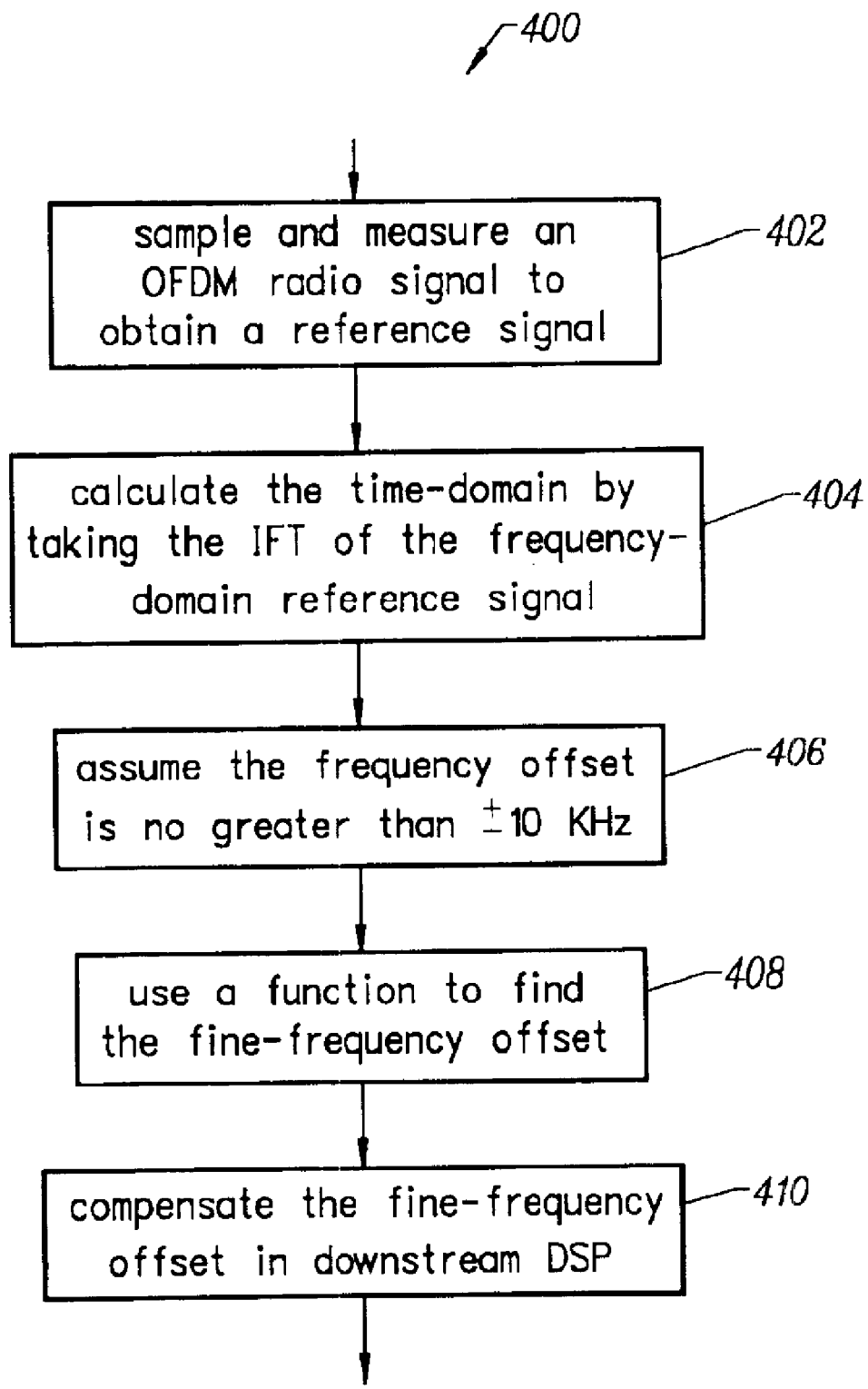
FIG. 3 is a flowchart of a method embodiment of the invention for determining the fine-frequency offset error from samples obtained during the long-preamble interval in the structure of FIG. 2.

FIG. 3 represents a method embodiment of the invention, and is referred to herein by the general reference numeral 400. The method 400 comprises a step 402 in which an OFDM transmission is I/Q sampled. The measurements represent a reference signal comprising a signal subspace and a non-signal subspace (spectral representation). The reference signal includes fifty-two non-zero equal magnitude subcarriers. A step 406 assumes the coarse frequency offset after compensation does not exceed ±10 kHz. A step 408 uses a cost function to determine a fine-frequency offset. A step 410 compensates the fine-frequency offset.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for fine frequency-offset error determination in a radio receiver, comprising the steps of:
   sampling an OFDM radio transmission;
   assuming a coarse frequency offset after compensation by a previous circuit that will not exceed approximately ±10 kHz; and
   using a cost function to determine a fine-frequency offset of said OFDM radio transmission for use in a subsequent circuit providing for frequency compensation of any fine-frequency offset.

2. The method of claim 1, further comprising the step of:
   determining a coarse frequency offset of said OFDM radio transmission.

3. The method of claim 1, further comprising the step of:
   compensating any coarse frequency offset determined in a previous step to at worst approximately ±10 kHz.

4. The method of claim 1, further comprising the step of:
   finding a timing reference boundary between a short preamble and a long preamble in said OFDM radio transmission.

5. The method of claim 1, wherein the step of using a cost function generally conforms to $$C(\hat{v}) = |V_0 X_{\hat{v}}|^2 = \left|\sum_{n=0}^{63} x(n)e^{-j2\pi\frac{\hat{v}}{F_s}n}\right|^2$$

where:
   $V_o$: non signed space vector,
   $X_{\hat{v}}$: signal space vectors,
   $x_n$: received signal samples,
   $F_s$: sampling frequency.

6. The method of claim 1, wherein the step of sampling is such that a signal subspace is spanned by a set of 52 row vectors derived from a 64×64 square matrix associated with a 64-element discrete Fourier transform wherein a non-signal subspace is spanned by a set of 12 row vectors also derived from the 64×64 square matrix associated with the 64-element discrete Fourier transform and wherein two of these vectors are real.

7. The method of claim 1, wherein the step of sampling is such said OFDM radio transmission is typically measured in 16-bit I/Q samples every 0.05 μS, and overall can be mathematically modeled as, $$x(n) = A(n)e^{j\Phi(n)+j2\pi\frac{v}{F_s}n+j\varphi} + \eta(n)$$

where,
   $\Phi(n)$: long preamble phase
   v: residual frequency offset
   φ: phase offset
   η(n): additive white Gaussian noise (AWGN).

8. A method for fine frequency-offset error determination in a radio receiver, comprising the steps of:
   sampling an OFDM radio transmission, wherein fifty-two non-zero equal magnitude subcarrier measurements are obtained that collectively represent a reference signal comprising a signal subspace and a non-signal subspace, and is such said OFDM radio transmission is typically measured in 16-bit I/Q samples every 0.05 μS, and overall can be mathematically modeled as, $$x(n) = A(n)e^{j\Phi(n)+j2\pi\frac{v}{F_s}n+j\varphi} + \eta(n)$$

where,
   $\Phi(n)$: long preamble phase
   v: residual frequency offset
   φ: phase offset
   η(n): additive white Gaussian noise (AWGN);
   determining a coarse frequency offset of said OFDM radio transmission;
   compensating any coarse frequency offset determined in a previous step to at worst approximately ±10 kHz;
   finding a timing reference boundary between a short preamble and said long preamble in said OFDM radio transmission;
   assuming a coarse frequency offset after compensation by a previous circuit will not exceed approximately ±10 kHz; and
   using a cost function to determine a fine-frequency offset of said OFDM radio transmission for use in a subsequent circuit providing for frequency compensation of any fine-frequency offset, wherein said cost function generally conforms to $$C(\hat{v}) = |V_0 X_{\hat{v}}|^2 = \left|\sum_{n=0}^{63} x(n)e^{-j2\pi\frac{\hat{v}}{F_s}n}\right|^2$$

where:
   $V_o$: non signed space vector,
   $X_{\hat{v}}$: signal space vectors,
   $x_n$: received signal samples,
   $F_s$: sampling frequency.

9. The method of claim 8, wherein the step of sampling is such that a signal subspace is spanned by a set of 52 row vectors derived from the 64×64 square matrix associated with the 64-element discrete Fourier transform wherein said non-signal subspace is spanned by a set of 12 row vectors also derived from the 64×64 square matrix associated with the 64-element discrete Fourier transform and wherein two of these vectors are real.

* * * * *

UNITED STATES PATENT AND TRADEMARK OFFICE
CERTIFICATE OF CORRECTION

PATENT NO. : 6,882,691 B2
DATED : April 19, 2005
INVENTOR(S) : Chiodini

It is certified that error appears in the above-identified patent and that said Letters Patent is hereby corrected as shown below:

Column 5,
Line 1, replace "6.3]" with -- 63] --.

Column 9,
Line 2, replace "said" with -- a --.

Signed and Sealed this

Twenty-fifth Day of October, 2005

JON W. DUDAS
*Director of the United States Patent and Trademark Office*